INVENTORS
Arthur H. Youmans
Thomas P. Hubbard, Jr.
BY
Robert M. Sperry
Agent

Jan. 30, 1962  A. H. YOUMANS ET AL  3,019,340
METHOD OF STABILIZING THE OUTPUT OF A
NUCLEAR EMISSION SOURCE
Filed July 1, 1957  2 Sheets-Sheet 2

INVENTORS
Arthur H. Youmans
Thomas P. Hubbard, Jr.
BY
Robert M. Sperry
Agent

United States Patent Office 3,019,340
Patented Jan. 30, 1962

3,019,340
METHOD OF STABILIZING THE OUTPUT OF A NUCLEAR EMISSION SOURCE
Arthur H. Youmans and Thomas P. Hubbard, Jr., Tulsa, Okla., assignors to Well Surveys, Incorporated, a corporation of Delaware
Filed July 1, 1957, Ser. No. 669,132
7 Claims. (Cl. 250—84.5)

This invention relates to nuclear emission and is particularly directed to novel methods for stabilizing the output of devices for producing nuclear emission through ion bombardment.

In the art of nuclear physics and chemistry, many operations require a source of nuclear emissions, such as gamma rays, neutrons, protons, deuterons or alpha particles. Among the most common sources of nuclear emission have been those devices which achieve nuclear emission by accelerating ions in a beam against a target formed of suitable material to produce a desired reaction. In sources of this sort it is conventional to produce ions of some particular elements and let these ions fall through a potential difference toward the target. This accelerating voltage accelerates them in a beam to strike the target at high energies, thus permitting certain nuclear reactions. For example, deuterons are accelerated to about 100 kev. against a tritium target to produce a nuclear reaction evolving neutrons of 14.1 mev. Unfortunately, these sources have been unsatisfactory for many applications because extremely complicated and expensive apparatus is required in order that the rate of emission be maintained constant. For example, it has been particularly difficult to stabilize the output from a neutron source of the type employed in radioactivity well logging and comprising a sealed ion accelerator and associated acceleration voltage generator.

This disadvantage of the prior art is overcome with the present invention and novel methods are provided for stabilizing the output of any device which produces nuclear emission through ion bombardment by means of a reaction which has a resonance peak.

The advantages of the present invention are preferably attained by selecting the target thickness and ion accelerating voltage such that, due to the resonance peak of the reaction, operation at a maximum point on the emission yield curve is obtained.

Accordingly, it is an object of the present invention to provide novel methods for stabilizing the output of devices which produce nuclear emission through ion bombardment by means of a reaction having a resonance peak.

A specific object of the present invention is to provide such a method comprising establishing the beam composition, target thickness and acceleration voltage such that, due to the resonance peak of the reaction, operation at a maximum point on the emission yield curve is obtained.

A further specific object of the present invention is to provide a novel method of stabilizing the output of a neutron source comprising a sealed ion accelerator and associated acceleration voltage generator of the type employed in radioactivity well logging.

These and other objects and features of the present invention will be apparent from the following description wherein reference is made to the figures of the accompanying drawings.

The applicants have found that there are four factors which vary the output of nuclear emission sources of the ion bombardment type. These factors are ion beam current, ion beam composition, ion beam accelerating voltage and target thickness. In the preferred embodiment of the invention the beam current is maintained constant and stabilization is accomplished by varying the other parameters.

Normally, the ion beam will be composed of a mixture of monatomic, diatomic, triatomic and possibly heavier ions of one or more isotopes of the same element. Each of these different types of ions will react somewhat differently with the target material. However, the beam composition, that is, the ratios of the different types of ions, will generally be constant for any given source. It is possible by conventional means to cause the beam to have a predetermined composition in some instances and, in any case, the composition may be determined. With the beam current constant and of known composition, stabilization of the output may be obtained by varying either the accelerating voltage or target thickness or both.

Figure 1:
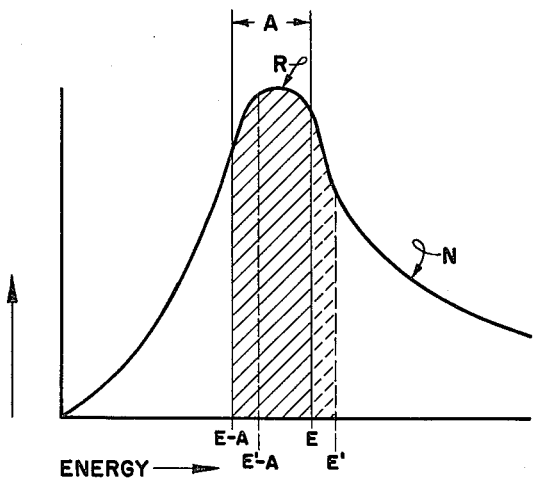
FIG. 1 shows a thin target yield curve for a reaction having a resonance peak. The shaded areas represent the emission resulting from bombardment of a target of finite thickness with a pure monatomic ion beam.

For simplicity, the method of stabilization will first be described for the case of a pure ion beam, that is, a beam composed of only one type of ions of a single isotope. For example, it may be desired to produce emission by bombarding a suitable single isotope target with a beam of monatomic ions. Curve N of FIG. 1 represents the thin target yield curve for a typical resonance type reaction, and R represents the resonance peak. For any target thickness, the ions will be slowed down as they pass through the target and, consequently, to obtain an optimum emission yield, the ions must strike the target with an energy above that of the resonance peak R, as indicated by line E of FIG. 1. With any practical accelerating voltage, the initial energies of the ions from the ion source will be negligible relative to the energy derived from the accelerating voltage. Substantially all ions will have the same charge, having lost one, and only one, electron, and therefore these ions upon striking the target will have energy E e.v. derived from the accelerating voltage E volts. In travelling through a thin target the ions are subject to atomic coulomb forces and are slowed down. A few react with nuclei of target atoms and are annihilated, but these may be neglected relative to the number that are merely slowed down on their way through the target. The number of ions leaving a target thinner than the range of the ions is, therefore, virtually the same as the number entering. Every ion not annihilated by a nuclear reaction is slowed or reduced in energy, at the same rate. As it is slowed it will have, at any instant, a probability of reacting with nuclei in accordance with curve N. The slowing may be measured in units of energy, and the thickness of a target may be measured in amounts of slowing or "stopping power" and therefore also in units of energy. The target thickness may thus be represented in FIG. 1 by the dimension A in units of energy and the energy retained by ions passing out of the target will then be E—A. The emission produced per beam atom is shown in FIG. 1 plotted as a function of energy and will be proportional to the shaded area of FIG. 1 lying below the curve N and between the lines E and E—A.

It has been found that any change in the accelerating voltage E will shift the position of the lines E and E—A but, when the instant invention is employed, such a change will not substantially change the area bounded by these lines below the curve N and, hence, will have substantially no effect on the total emission yield.

By properly selecting the values for the accelerating voltage E and target thickness A, a condition may be obtained such that the reaction cross-section for ions striking the target with energy E is approximately equal to the reaction cross-section for ions leaving the target with energy E—A. Applicants have found that, for any given value of accelerating voltage, there is a specific value of target thickness at which, due to the resonance peak of the reaction, a maximum point on the emission yield curve is obtained at this voltage. That is, the target thickness is selected so that for such thickness the maximum yield is obtained at the selected accelerating voltage in order that the neutron yield remains reasonably constant as the voltage varies by moderate amounts from the selected value, the selected value being one conveniently available. Obviously, this emission yield will be less than that which can be obtained with a thick target which absorbs all of the bombarding ions. However, when applicants' relationship has been established, moderate changes in the value of the accelerating voltage have substantially no effect on the emission yield. Hence, the operation of the device has been stabilized. Conversely, for a given target thickness the accelerating voltage may be adjusted to operate on this maximum point on the emission yield curve. Thus, this condition may be obtained by adjusting either the accelerating voltage E or the target thickness A or both. Thus, the operator has the option of establishing the accelerating voltage at a desired level and obtaining the desired equilibrium condition by varying the target thickness, or of maintaining the target thickness fixed and adjusting the accelerating voltage to obtain equilibrium. Furthermore, as indicated above, if neither of these parameters is critical, both may be adjusted to obtain the desired condition for stabilized operation.

As will be seen in FIG. 1, this equilibrium will be obtained when the energy of the ions striking the target, E, is greater than the energy of the resonance peak R of the reaction and the energy of the ions leaving the target, E—A, is less than the energy of the resonance point R. When this condition obtains, a change in accelerating voltage will shift the energy with which the ions strike the target, for example, from E to E', and it will be seen that, in this case, the emission yield of these ions has been reduced. On the other hand, the change in accelerating voltage will also shift the energy of the ions leaving the target after passing through it from E—A to E'—A. This causes an increase in the emission yield of the ions leaving the target which will compensate for the loss of emission yield suffered by the ions entering the target with the result that the total emission yield will remain unchanged. The area under curve N between E and E—A is substantially the same as the area under the curve between E' and E'—A. Thus, for moderate changes in accelerating voltage, the total emission yield has been stabilized.

In reactions involving more than one type of ion, for example, where the ion beam is composed of both monatomic and diatomic ions of a single isotope, stabilization may be obtained in a similar manner in the vicinity of the resonance peak of the reaction. It will be understood that, since there are more atoms in a polyatomic ion than in a monatomic ion, the emission yield for any polyatomic ion will be greater than that for any smaller ion of the same energy per atom. On the other hand, since the mass of a polyatomic ion is greater than that of a monatomic ion, the acceleration provided by any given accelerating voltage will result in a lower energy per atom than for a smaller ion. Thus, for example, one microampere of diatomic ions at energy E will provide an emission yield equal to that provided by two microamperes of monatomic ions at energy E/2.

Figure 2:
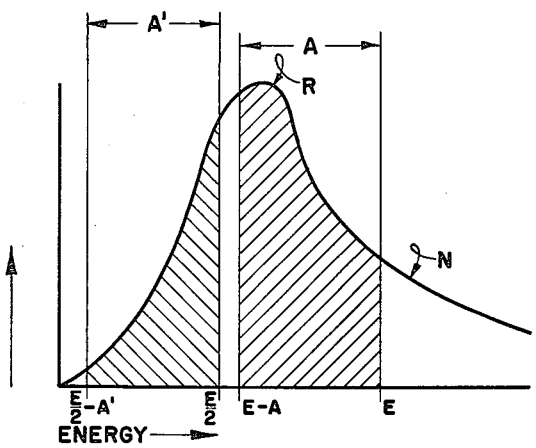
FIG. 2 shows a thin target yield curve similar to that of FIG. 1, with the shaded areas representing the emission resulting from bombardment of a target of finite thickness with a beam composed of both monatomic and diatomic ions.

As seen in FIG. 2, to determine an optimum point for reactions involving monatomic and diatomic beam ions, the emission resulting from the monatomic component of the ion beam may be represented in the manner described in connection with FIG. 1. That is, if the ion beam is maintained constant and an accelerating voltage E is applied, the target thickness will appear as dimension A and the monatomic ions will emerge from the target with energy E—A. The shaded area beneath curve N and bounded by the lines E and E—A will then represent the emission for each unit of beam current. In addition to this, there will be an emission yield due to the diatomic ions. Since, as pointed out above, the mass of the diatomic ions is greater than that of the monatomic ions, the energy per atom of the diatomic ions will be proportionately less for any given accelerating voltage. Thus, since the ion beam of FIG. 2 is composed of monatomic and diatomic ions, the atoms of the diatomic ions will strike the target with energy E/2.

The target penetration or particle range of the diatomic ions will be A'. Where A' is the stopping power of the target for diatomic ions of energy E; this stopping power, of course, is the same as the stopping power of the target for a monatomic ion of energy E/2. Thus A' can be determined from the range-energy curve for the monatomic ions. Accordingly, the residual energy of each atom of the diatomic ions on leaving the target will be $$\frac{E}{2} - A'$$

and the emission yield resulting from bombardment of the target by the diatomic component of the ion beam may be represented in FIG. 2 by two times the shaded area below curve N bounded by the lines $$\frac{E}{2} \text{ and } \frac{E}{2} - A'$$

It must be remembered that the diatomic component is equivalent to a monatomic beam of half the energy and twice the intensity. Therefore, the shaded area actually represents only half of the emission caused by the diatomic ions.

It will be apparent from FIG. 2, that any change in the accelerating voltage E will cause both of these areas to shift. However, by using values of accelerating voltage E and target thickness A to operate at the equilibrium point, additional moderate changes in accelerating voltage E will have little effect on the emission yield.

Figure 3:
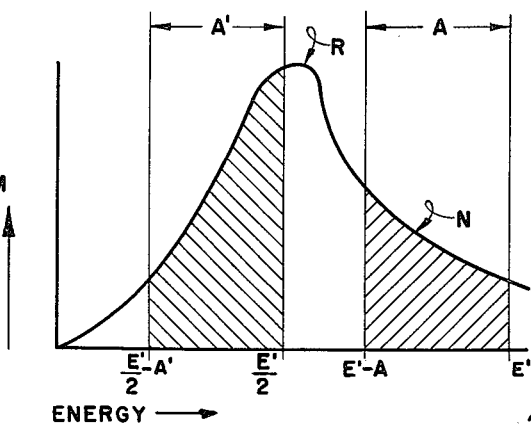
FIG. 3 shows the same thin target yield curve as that of FIG. 2 but the shaded portions represent the neutron output at an increased accelerating voltage.

FIG. 3 is similar to FIG. 2, but shows that when the equilibrium point has been obtained, a shift in accelerating voltage from E, in FIG. 2, to E', in FIG. 3, will cause the emission yield of the monatomic ions to decrease while the emission yield of the diatomic ions is increased. Thus, for reasonably large changes in accelerating voltage, the total emission will be stabilized.

In some instances, it may be necessary to employ a composite target and/or an ion beam composed of more than one isotope or even of isotopes of different elements. Nevertheless, it has been found that where the ratio of the mass of the monatomic ion of the heavier isotope to that of the monatomic ion of the lighter isotope is less than about two to one, the method of the present invention is still applicable. However, since the ion beam may be composed of both monatomic and polyatomic ions of each isotope, the conditions for stabilization will obviously be considerably more complex. In addition there may be ions which are composed of particles of both isotopes.

To demonstrate this form of the invention, let us assume that it is desired to bombard a target composed of deuterium and tritium with an ion beam composed of ions of each or both of these isotopes. It will be seen that under these conditions there will be at least six reactions taking place simultaneously. There will be deuterium ions bombarding tritium atoms in the target, deuterium ions bombarding deuterium target atoms, tritium ions bombarding deuterium atoms, tritium ions bombarding tritium atoms composite deuterium-tritium ions bombarding deuterium atoms, and composite deuterium-tritium ions bombarding tritium atoms. Furthermore, each of these reactions has a resonance at a different energy level. In addition, the deuterons and tritons may be both monatomic and polyatomic.

Fortunately, much of this complexity may be ignored. At energies between 100 kev. to 200 kev., the reactions caused by deuterium ions bombarding tritium atoms and by tritium ions bombarding deuterium atoms both reach their resonance peaks. On the other hand, the emission yield for deuterium ions bombarding deuterium atoms is about $\frac{1}{300}$ that of either of the two former reactions and the emission yield for tritium ions bombarding tritium atoms is considerably less than any of these. Consequently, the emission yield resulting from these last two reactions may generally be ignored. On the other hand, when the composite deuterium-tritium ions strike the target atoms, the ions react as monatomic ions of their respective isotopes and the energy of the composite ion is shared by its components in proportion to their mass ratio. Thus, the tritium component reacts as a monatomic tritium ion of $\frac{3}{5}$ the energy of the composite ion while the deuterium ion reacts as a monatomic deuterium ion of $\frac{2}{5}$ the energy of the composite ion. Since this is so, the emission yield of the composite ions has a substantial effect on the total emission yield. This effect may be determined by considering the components separately at their proportionate energies.

In considering the isotopically pure ion beams, the monatomic and diatomic components contribute significantly to the emission yield. However, at energies less than about 400 kev., the emission resulting from heavier components is negligible and may safely be ignored.

Figure 4:
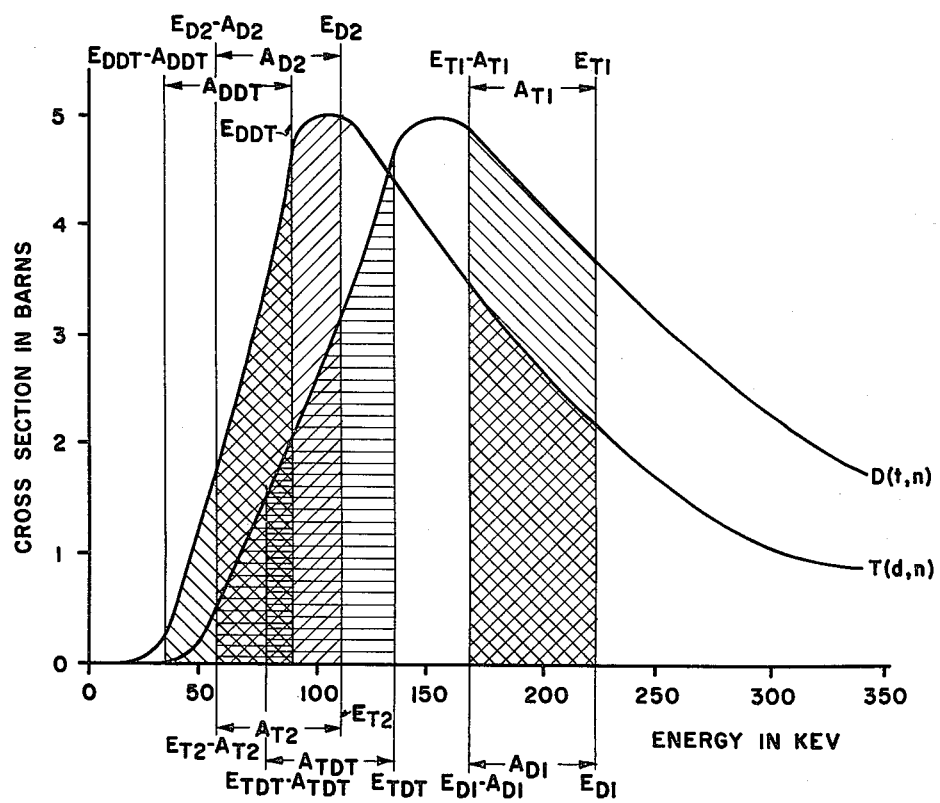
FIG. 4 shows thin target yield curves for the reactions resulting from bombarding a target composed of deuterium and tritium with an ion beam having deuterium ions, tritium ions and composite deuterium-tritium ions with the shaded areas representing the emission caused by the various types of ions with a target of finite thickness.

Applying the foregoing discussion to the case where a target formed of deuterium and tritium is bombarded by an ion beam composed of deuterium ions, tritium ions and composite deuterium-tritium ions, to produce neutron emission, as in the case of a borehole accelerator for radioactivity well logging, it will be seen that to obtain stable neutron emission we must obtain an equilibrium for the emission yields resulting from bombardment of deuterium atoms by monatomic and diatomic tritium ions and the tritium component of composite deuterium-tritium ions and from bombardment of tritium atoms by monatomic and diatomic deuterium ions and the deuterium component of the composite ions. Since the energies with which these various types of ions strike the target are dependent upon mass, it will be apparent that these values will be different for each type of ion, as indicated in FIG. 4. As pointed out above, the target thickness, measured in terms of stopping power will also be a function of the mass of the incident ions. However, for deuterium and tritium ions having energies less than about 500 kev., the stopping power of the target may be considered essentially independent of both the mass and the energy of the ions.

As seen in FIG. 4, the curve $T(d,n)$ is the neutron emission yield curve for bombardment of tritium atoms by deuterium ions while the curve $D(t,n)$ is the neutron emission yield curve for bombardment of deuterium atoms by tritium ions. Considering first the $T(d,n)$ curve, the monatomic deuterium ions strike the target with energy $E_{D1}$ and the target thickness is $A_{D1}$ so that these ions after passing through the target emerge with energy $E_{D1}-A_{D1}$ and the neutron emission yield is proportional to the area bounded by these lines and below the curve $T(d,n)$. The diatomic deuterium ions strike the target with energy $E_{D2}$ and the target thickness is $A_{D2}$ so that these ions after passing through the target emerge with energy $E_{D2}-A_{D2}$ and the neutron emission yield is proportional to the area bounded by these lines and the curve $T(d,n)$. Similarly, the deuterium components of the composite deuterium-tritium ions will strike the target with energy $E_{DDT}$ and will produce a neutron emission yield proportional to the area bounded by the lines $E_{DDT}$ and $E_{DDT}-A_{DDT}$ and lying below the curve $T(d,n)$.

Looking at the curve $D(t,n)$, the monatomic tritium ions strike the target with energy $E_{T1}$ and the target thickness is $A_{T1}$ so that after passing through the target, these ions emerge with energy $E_{T1}-A_{T1}$ and will produce a neutron emission yield proportional to the area bounded by the lines $E_{T1}-A_{T1}$ and lying below the curve $D(t,n)$. The diatomic tritium ions strike the target with energy $E_{T2}$ and will produce a neutron emission yield proportional to the area bounded by the lines $E_{T2}$ and $E_{T2}-A_{T2}$ and the curve $D(t,n)$. To complete the picture, the tritium components of the composite deuterium-tritium ions will strike the target with energy $E_{TDT}$ and will produce a neutron emission yield proportional to the area bounded by the lines $E_{TDT}$ and $E_{TDT}-A_{TDT}$ and the curve $D(t,n)$.

As seen in FIG. 4, equilibrium may be obtained by balancing the neutron emission yields of the two monatomic ion beam components against the neutron emission yields of the four diatomic and composite ion beam components in substantially the same manner as described above with respect to FIGS. 1, 2 and 3. Thus, by properly selecting the values of the accelerating voltage E and target thickness A, a point will be found about which reasonable changes in accelerating voltage have little effect on the total neutron emission yield.

Following this method, applicants have found that, in devices of the type which are employed in radioactivity well logging to produce neutron emission by the deuterium-tritium reaction, stabilization may be obtained with a target having a stopping power between 50 and 250 kev., depending upon the target and beam composition, at accelerating voltages of less than 500 kev.

For example, typical apparatus of this type used for radioactivity well logging is illustrated in FIG. 2 of U.S. Patent 2,689,918 to Arthur H. Youmans and is fully described in the specification therof at column 3, line 70, to column 4, line 60. When such apparatus is made in accordance with the present invention, high voltage supply 34 is less than 500 kev. and target 36 has a stopping power between 50 and 250 kev. or, more particularly, in the relationships described herein.

In the foregoing description it has been shown that stabilization may be obtained both for simple cases, in which a one or two component single isotope ion beam bombards a single isotope target, and for more complex cases, in which a multi-component multi-isotope ion beam bombards a multi-isotope target, by properly selecting accelerating voltage and target thickness. The problem thus becomes one of determining the values of these parameters.

To provide a general equation for determining the proper accelerating voltage and target thickness, it must be considered that there may be both monatomic and polyatomic ions bombarding a target composed of Q different isotopes. Thus, there will be N kinds of ions, in the series monatomic, diatomic, triatomic, etc. ions where polyatomic ions may be composed of more than one isotope. As stated previously, the ion beam composition can be determined and, after this is known, the total emission yield may be calculated for a variety of accelerating voltages from the formula $$\sum_{q=1}^{Q}\sum_{n=1}^{N} In\, Cqn\, An = Y = \text{emission yield}$$

where:

$Cqn$ = average probability, for the particular target, of the reaction of the $n$ ion with the $q$ target atom in the energy range $En$ to $En-An$ where $En$ is the energy with which the $n$ ion strikes the target and $An$ is the stopping power of the target for the $n$ ion of energy $En$ $In$ = number of $n$ ions striking the target per unit of time.

If a graph according to this relation is plotted showing emission yield as a function of accelerating voltage for the particular target thickness, target composition and beam composition, the graph will indicate that the emission yield reaches a maximum at a particular value of accelerating voltage and it is at this value the stabilized operation will be obtained.

In the alternative, if the accelerating voltage is fixed, the total emission yield may be calculated for a variety of target thicknesses and a graph showing the emission yield as a function of target thickness will, then, indicate the target thickness at which stabilized operation at the given acceleraing voltages may be obtained.

Figure 5:
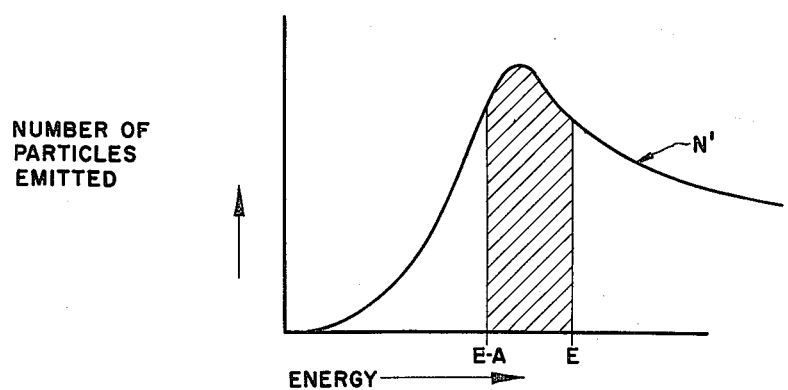
FIG. 5 shows a thin target yield curve similar to that of FIG. 1 showing the result when the ion beam current increases uniformly with the accelerating voltage.

While it has been assumed in the foregoiig description that the beam current is maintained constant, it is possible to employ the same method of stabilization for devices in which the beam current is not constant provided that the beam current varies in such a manner as to be always functionally related to the accelerating voltage. Thus, for example, if the beam current increases linearly with the accelerating voltage, the effect would be essentially to increase the values of curve N proportionately, and it will be obvious from FIG. 5 that the method of the present invention will still be applicable to obtain stabilization of the emission and, in fact, the equations given above would still be approximately correct. Thus, in FIG. 5, curve N' represents the number of particles emitted for the total number of beam ions of particular energy.

Numerous other variations and modifications of the present invention may obviously be made without departing from the present invention. Accordingly, it should be clearly understood that those forms of the invention described above and shown in the figures of the accompanying drawings are illustrative only and are not intended to limit the scope of the invention.

We claim:

1. The method of stabilizing the output of a device for producing nuclear emission by means of ion bombardment of a target, said method comprising the steps of producing an ion beam of predetermined composition, forming a target of material which will produce nuclear emission upon bombardment of said target with ions of said beam by a reaction having a resonance peak, establishing the target thickness and ion beam accelerating voltage such that, due to the resonance peak of said reaction, upon moderate variation in accelerating voltage the change in nuclear emission occasioned by the change thus effected in the energy of ions entering said target is substantially equal and opposite to the change in nuclear emission occasioned by the change thus effected in the energy of ions leaving said target.

2. The method of adjusting for stable operation a device for producing nuclear emission by means of ion bombardment of a target, said method comprising the steps of producing an ion beam of predetermined composition, forming a target of a predetermined thickness of a material which will produce nuclear emission in response to bombardment of said target by ions of said beam as a result of a reaction having a resonance peak, and adjusting the ion accelerating voltage to a value at which, due to the resonance peak of said reaction, the nuclear emission produced per unit of thickness in the first differential increment of said target is substantially equal to the nuclear emission produced per unit of thickness in the last differential increment of said target.

3. The method of stabilizing the output of a device for producing nuclear emission by means of ion bombardment of a target, said method comprising the steps of producing an ion beam of predetermined composition, forming a target of a material which will produce nuclear emission in response to bombardment of said target by ions of said beam as a result of a reaction having a resonance peak, accelerating said ions toward said target with a predetermined accelerating voltage, and adjusting the thickness of said target to a value at which, due to the resonance peak of said reaction, upon moderate variation in the accelerating voltage the change in nuclear emission occasioned by the change thus effected in the energy of ions entering the target is substantially equal and opposite to the change in nuclear emission occasioned by the change thus effected in the energy of ions leaving said target.

4. The method of adjusting for stable operation a device which employs ion bombardment to produce nuclear emission from a target my means of a reaction having a resonance peak, said method comprising the steps of producing an ion beam composed of a single type of ions of a single isotope, accelerating the ions of said beam toward said target with an energy greater than that of the resonance peak of said reaction, and establishing the accelerating voltage and target thickness such that the reaction cross-section for ions entering the target substantially equals the reaction cross-section for ions leaving the target after passing through the target.

5. The method of adjusting for stable operation a device for producing neutrons by bombarding a target composed of deuterium and tritium with an ion beam composed of deuterium and tritium ions, said method comprising the steps of producing an ion beam of predetermined composition accelerating the ions of said beam with a specific accelerating voltage greater than that of a resonance peak of the deuterium-tritium reaction to cause said ion beam to strike said target, and establishing the accelerating voltage and target thickness such that upon moderate variation in accelerating voltage the change in neutron emission occasioned by the change thus effected in the energy of the ions entering said target is substantially equal and opposite to the change in nuclear emission occasioned by the change thus effected in the energy of the ions leaving said target.

6. The method of adjusting for stable operation a device for producing nuclear emission by means of ion bombardment of a target, said method comprising the steps of producing an ion beam of a predetermined composition of ions of at least one isotope of hydrogen, forming a target of a predetermined thickness of at least one isotope of hydrogen which will produce nuclear emission in response to bombardment of said target by said ion beam as a result of a reaction having a resonance peak, and accelerating the ions of said beam with an accelerating voltage such that the nuclear emission produced per unit of thickness in the first differential increment of said target is substantially equal to the nuclear emission produced per unit of thickness in the last differential increment of said target.

7. The method of adjusting for stable operation a device for producing nuclear emission by means of ion bombardment of a target, said method comprising the steps of producing an ion beam of predetermined composition, forming a target of a material which will produce nuclear emission in response to bombardment of said target with ions of said beam by a reaction having a resonance peak, accelerating said ions toward said target with an accelerating voltage which is related to the target thickness in accordance with the equation $$Y = \sum_{q=1}^{Q} \sum_{n=1}^{N} InCqnAn$$

to obtain operation at a maximum in the emission yield where Y is the emission yield, Q is the number of different isotopes in the target, $q$ is a particular atom of the target, N is the number of kinds of ions in the beam, $n$ is a particular ion of the beam, I$n$ is the number of $n$ ions striking the target per unit time, C$qn$ is the average probability, for the particular target, of the reaction of the $n$ ion with the $q$ target atom in the energy range E$n$ to E$n$—A$n$ where E$n$ is the energy with which the $n$ ion strikes the target and A$n$ is the stopping power of the target for the $n$ ion of energy E$n$.

References Cited in the file of this patent

UNITED STATES PATENTS

| | | |
|---|---|---|
| 2,287,619 | Kallmann et al. | June 23, 1942 |
| 2,525,832 | Sheldon | Oct. 17, 1950 |
| 2,769,096 | Frey | Oct. 30, 1956 |
| 2,816,242 | Goodman | Dec. 10, 1957 |
| 2,845,560 | Curtis et al. | July 29, 1958 |
| 2,872,583 | Owen | Feb. 3, 1959 |
| 2,885,584 | Van De Graaff | May 5, 1959 |
| 2,908,823 | Ely | Oct. 13, 1959 |
| 2,929,933 | Ela et al. | Mar. 22, 1960 |

OTHER REFERENCES

Landenburg et al.: "On Neutrons From the Deuteron-Deuteron Reaction," Physical Review, Nov. 1, 1937, pages 911 to 918.

Hanson et al.: Reviews of Modern Physics, vol. 21, No. 4, October 1949, pp. 635–650.

Semat: Introduction to Atomic and Nuclear Physics, 3 ed., published 1954 by Reinhart & Co., New York, pp. 55–58.

Warters et al.: "The Elastic Scattering of Protons by Lithuim," Physical Review, vol. 91, Aug. 15, 1953, pages 917–921.

UNITED STATES PATENT OFFICE
CERTIFICATE OF CORRECTION

Patent No. 3,019,340  January 30, 1962

Arthur H. Youmans et al.

It is hereby certified that error appears in the above numbered patent requiring correction and that the said Letters Patent should read as corrected below.

Column 6, line 22, after "lines" insert -- $E_{T1}$ and --; line 52, for "therof" read -- thereof --; column 7, line 30, for "acceleraing" read -- accelerating --; line 31, for "foregoiig" read -- foregoing --; column 8, line 27, for "my" read -- by --.

Signed and sealed this 5th day of June 1962.

(SEAL)

Attest:

ERNEST W. SWIDER
Attesting Officer

DAVID L. LADD
Commissioner of Patents